United States Patent
Christianson et al.

(10) Patent No.: US 8,327,273 B2
(45) Date of Patent: Dec. 4, 2012

(54) USER-DRIVEN MOBILE DEVICE PROFILING FOR A MOBILE WEBSITE

(75) Inventors: Ryan Christianson, Lynnwood, WA (US); John Kehle, Kirkland, WA (US)

(73) Assignee: Disney Enterprises, Inc., Burbank, CA (US)

( * ) Notice: Subject to any disclaimer, the term of this patent is extended or adjusted under 35 U.S.C. 154(b) by 372 days.

(21) Appl. No.: 12/567,970

(22) Filed: Sep. 28, 2009

(65) Prior Publication Data
US 2011/0078582 A1    Mar. 31, 2011

(51) Int. Cl.
G06F 3/00 (2006.01)
G06F 17/00 (2006.01)
G06F 3/14 (2006.01)
G06F 15/16 (2006.01)

(52) U.S. Cl. ........ 715/745; 715/238; 715/744; 715/747; 715/760; 715/864; 709/217

(58) Field of Classification Search .......... 715/747, 715/745, 744, 760, 864, 238, 866; 709/217
See application file for complete search history.

(56) References Cited

U.S. PATENT DOCUMENTS

| | | | | |
|---|---|---|---|---|
| 6,412,008 | B1 * | 6/2002 | Fields et al. | 709/228 |
| 7,356,332 | B2 * | 4/2008 | Pell et al. | 455/414.1 |
| 7,529,792 | B2 * | 5/2009 | Dietl | 709/203 |
| 7,627,648 | B1 * | 12/2009 | Mehta et al. | 709/217 |
| 7,653,875 | B2 * | 1/2010 | Jennings et al. | 715/235 |
| 7,671,869 | B2 * | 3/2010 | Arnold et al. | 345/581 |
| 7,680,755 | B2 * | 3/2010 | Machani | 706/47 |
| 7,895,234 | B2 * | 2/2011 | Lillie et al. | 707/784 |
| 2003/0167334 | A1 * | 9/2003 | Butler | 709/227 |
| 2008/0172373 | A1 * | 7/2008 | Jenson et al. | 707/5 |
| 2008/0189423 | A1 * | 8/2008 | Takahashi et al. | 709/227 |
| 2009/0198653 | A1 * | 8/2009 | Christianson | 707/3 |
| 2009/0282344 | A1 * | 11/2009 | Kim | 715/744 |
| 2010/0211865 | A1 * | 8/2010 | Fanning et al. | 715/234 |
| 2011/0072089 | A1 * | 3/2011 | Broman et al. | 709/206 |

OTHER PUBLICATIONS

Mohomed et al., Context-Aware Interactive Content Adaptation, 2006, ACM.*
Mohomed et al., URICA: Usage-awaRe Interactive Content Adaptation for Mobile Devices, 2006, ACM.*

* cited by examiner

*Primary Examiner* — Tadeese Hailu
*Assistant Examiner* — Nicholas Ulrich
(74) *Attorney, Agent, or Firm* — Smith Risley Tempel Santos LLC; Michael J. Tempel

(57) ABSTRACT

Various embodiments of systems, methods, and computer programs are provided. One embodiment is a method for providing a mobile website. The method comprises: enabling a plurality of first users of a mobile website to define a preferred presentation configuration for presenting the mobile website to a corresponding first mobile communication device; storing each preferred presentation configuration in association with mobile device information related to the corresponding first mobile communication device; receiving a request for the mobile website from a new user of a second mobile communication device; determining mobile device information related to the second mobile communication device; and selecting a customized presentation configuration based on: the mobile device information related to the second mobile communication device; and one or more of the preferred presentation configurations and associated mobile device information.

22 Claims, 4 Drawing Sheets

USER-DRIVEN MOBILE DEVICE PROFILING FOR A MOBILE WEBSITE

BACKGROUND

The convergence of computing and communications technologies is making it possible for mobile communication devices to access information nearly anywhere and anytime. The technologies supporting wide area wireless networking and mobile telephony, for example, are in the process of merging to provide an infrastructure that offers nearly ubiquitous on-line access. These technologies enable mobile communication devices (e.g., mobile phones, personal digital assistants, notebook computers, laptops, etc.) to access applications or any form of digital content on the Internet via a mobile communication network, such as, a carrier network or other wireless connection to the Internet.

A typical mobile communication device interfaces with a carrier network that provides mobile data communications, in addition to traditional voice services. For data communications, the carrier network may include a carrier server that provides an interface to sources on the Internet (e.g., web servers). The web servers may provide a specially-configured mobile website that provides any combination of content and/or functionality via suitable protocols for mobile communication. Mobile websites are typically configured and/or formatted to address certain limitations inherent in mobile communication devices, such as, for example, the reduced size of mobile communication devices and other device or network limitations (e.g., display size, processing power, battery life, bandwidth, etc.). For example, to provide an improved user experience in the mobile environment, many content providers customize the design of the mobile website to address these and other limitations.

Mobile websites may be custom designed for the mobile environment using specific computer languages, such as, for example, style sheet languages. Style sheet languages (e.g., Cascading Style Sheets (CSS)) are used to describe the presentation of the mobile website in a markup language (e.g., HTML, XHTML, or other markup languages). Style sheet languages are designed to enable the separation of the document content from the document presentation. This content-presentation separation can be used in the design of the mobile website to specify different presentation schemes based on different types of mobile communication devices or other situations. The presentation schemes typically specify, for example, different markup tags, image sizes, and amount of content on the page. The presentation schemes are used based on, for example, the type of network supported by the mobile communication device, the size of the screen on the device, processing power, and other features and/or capabilities supported by the mobile communication device.

However, this solution has several limitations. The content provider is still required to define the particular presentation schemes and configure the mobile website in such a manner to support the presentation schemes. Because of the large number of customization parameters and scenarios, it can be very time-consuming and costly to define and configure the mobile website to support a large number of presentation schemes. The increasingly large number of types of mobile communication devices and the changing preferences of their users exacerbate this problem.

Thus, there is a need in the industry for improved systems, methods, and computer programs for profiling the presentation schemes for mobile websites.

SUMMARY

Various embodiments of systems, methods, and computer programs are provided. One embodiment is a method for providing a mobile website. The method comprises: enabling a first user of a mobile website to define a preferred presentation configuration for presenting the mobile website to a corresponding first mobile communication device; storing the preferred presentation configuration in association with mobile device information related to the corresponding first mobile communication device; receiving a request for the mobile website from a new user of a second mobile communication device; determining mobile device information related to the second mobile communication device; and selecting a customized presentation configuration based on the mobile device information related to the second mobile communication device and the preferred presentation configuration and associated mobile device information.

Another embodiment is a computer program embodied in a computer-readable medium and executable by one or more servers. The computer program comprises logic configured to implement various functions. In an embodiment, the computer program receives a request for a mobile website from a mobile communication device associated with a user. The computer program determines whether there is an existing presentation configuration associated with the user for the mobile website. If there is not an existing presentation configuration associated with the user, the computer program implements additional functions. The computer program determines mobile device information associated with the mobile communication device, and selects one of a plurality of stored presentation configurations based on the mobile device information. The stored presentation configurations are defined by a plurality of existing users of the mobile website and are associated with mobile device information related to the existing users. The computer program provides the mobile website to the mobile communication device according to the selected presentation configuration.

Yet another embodiment is a computer system for profiling presentation configurations for a mobile website. An embodiment of one such computer system comprises a database and a web server. The web server is in communication with the database and configured to provide a mobile website. The web server comprises a presentation configuration customization module and a presentation configuration matching module. These modules comprise logic configured to implement certain functions. The presentation configuration customization module enables a plurality of first users of the mobile website to specify a preferred presentation configuration for presenting the mobile website to a corresponding first mobile communication device. The presentation configuration customization module stores, in the database, each preferred presentation configuration and mobile device information related to the corresponding first mobile communication device. The presentation configuration matching module receives a request for the mobile website from a new user of a second mobile communication device, and determines mobile device information related to the second mobile communication device. The presentation configuration matching module selects one of the plurality of preferred presentation configurations based on the mobile device information related to the second mobile communication device, and then provides the mobile website to the second mobile device according to the selected preferred presentation configuration.

DETAILED DESCRIPTION

Figure 1:
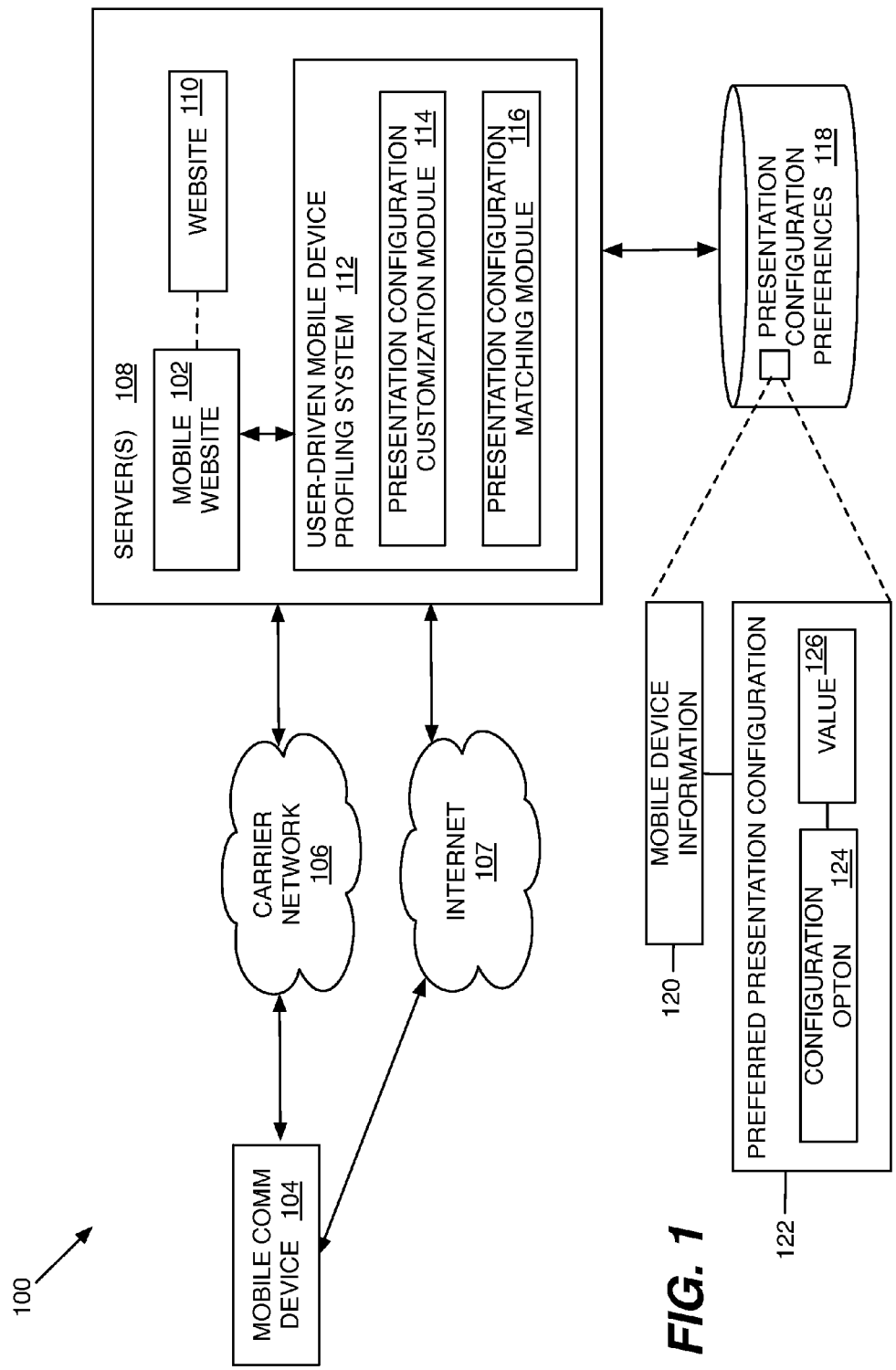
FIG. 1 is a block diagram illustrating an embodiment of a computer system for implementing a user-driven mobile device profiling system for a mobile website.

Embodiments of systems, methods, and computer programs are disclosed for profiling and presenting a mobile website to a mobile communication device. Various exemplary embodiments are described below in detail in connection with FIGS. 1-4. As an introductory matter, an exemplary user-driven mobile device profiling method will be described. In general, the user-driven method comprises two general processes: (1) a user profiling process; and (2) a new user matching process. In the user profiling process, a mobile website is used to enable a plurality of users to define, via the mobile website, a preferred presentation configuration. The preferred presentation configuration comprises one or more configuration options that specify the manner in which the mobile website is to be presented to the user. The configuration options may comprise any desirable presentation characteristic related to the mobile website and/or characteristics of the mobile communication device. The configurations options may specify, for example, characteristics of, or the manner in which, content or functionality is to be presented to the mobile communication device. In an embodiment, the configuration options may comprise any of the following or other presentation characteristics: display size; display resolution; image resolution; size of images to be displayed; image orientation (e.g., portrait or landscape); number of images to be displayed; font size or color; amount of content to be displayed in any particular text section or page; page layout; color of layout elements; or presentation theme.

Regardless the configuration option(s) specified by the user, the preferred presentation configurations are stored in a presentation configuration preferences database. The configuration options are stored in the database in association with certain information related to the mobile communication devices. For example, a user A may be a subscriber of a particular carrier network, and may access the mobile website via the associated carrier network (or other wireless communication network) using a particular type of a mobile communication device having certain types and versions of software. The configuration option(s) specified by the user A may be stored in association with this mobile device information. Similarly, other users may specify configuration option(s), which are also stored with the corresponding mobile device information. In this manner, the user preferences database comprises a database of user-specified presentation configuration preferences and corresponding mobile device information. The mobile device information may comprise various types of information about the mobile communication device used to access the mobile website. For example, in an embodiment, the mobile device information may comprise any of the following or other types of information: information about the physical mobile communication device (e.g., type of device, device model, display size, processor, etc.); information about software located on the mobile communication device (e.g., type or version of browser or other software); or information about the carrier network or other wireless network used to access the mobile website (e.g., the carrier name, mobile phone standards or technology used by the carrier network, etc.).

In the new user matching process, a new user requests the mobile website. Mobile device information associated with the new user's mobile communication device may be determined. Based on the mobile device information associated with the new user and the preferred presentation configurations specified by the existing users, the mobile website is presented to the new user with matching configuration option(s). The server providing the mobile website may select the preferred presentation configuration that best matches the new user's mobile device information. For example, following the above example of user A, the new user may be a subscriber of the same carrier network as user A and have a similar device. Based on the similar mobile device information, the server may present the mobile website to the new user according to the configuration option(s) specified by user A. The server need not select a matching preferred presentation configuration. For example, in an embodiment, the server may include a presentation configuration matching module that processes the data contained in the presentation configuration preferences database, according to the mobile device information, and generates common or default profiles to be selected for new users. The new user may modify the automatically selected profile, in which case the configuration option(s) specified by the new user (and the new user's mobile device information) are added to the database. In this manner, the user-driven profiling method may quickly capture user profiles and continually adapt to changing user preferences.

FIG. 1 generally illustrates a computer system 100 for implementing various embodiments of systems, methods, and computer programs for profiling and presenting a mobile website 102 to mobile communication devices 104 via a carrier network 106 and/or a wireless connection to a communication network, such as, the Internet 107. In general, the computer system 100 enables a mobile communication device 104 to access the mobile website 102 hosted on one or more servers 108. The server(s) 108 may comprise carrier server(s), web server(s), or any combination thereof. The carrier network 106 may provide voice and data communication services to the mobile communication devices 104. To facilitate data communications, the mobile carrier may provide a carrier server that functions as an interface to wide area data networks (e.g., the Internet 107). The carrier server may enable the mobile communication device 104 to interface with web servers via, for example, the Internet.

It should be appreciated that mobile communication devices 104 may comprise a mobile phone, a personal digital assistant, a notebook or laptop, or any other portable computing device or non-portable computing device that supports communication over a carrier network 106 or a wireless connection to a communication network, such as, the Internet 107. The particular supporting mobile and other communication protocols are not relevant to the particular embodiments described, and as such any communication protocol(s) may be used. It should be appreciated that the systems, methods, and computer programs for profiling and presenting the mobile website 102 may be implemented via any suitable communications network (e.g., carrier network 106, the Internet 107, a wireless network, etc.) and any mobile website. For example, the mobile website 102 may comprise any information, content, and/or functionality that is configured and/or formatted for presentation to a mobile communication device 104 via the carrier network 108, the Internet 107, any other wireless network, or any combination thereof. The mobile website 102 may support any suitable content and/or functionality. In one of a number of possible embodiments, the mobile website 102 may support, for example, any suitable protocols, markup languages, or standards for wireless communication, including, but not limited to, wireless application protocol (WAP), TCP-IP, WAP datagram protocol (WDP), wireless markup language (WML), and XHTML, to name a few.

The server 108 (which may comprise one or more servers) hosts the mobile website 102 and other websites 110 (mobile or otherwise). The server 108 comprises a user-driven mobile device profiling system 112, which comprises the logic and/or functionality for implementing the profiling and matching processes described above, and the additional embodiments described below. In an embodiment, the user-driven mobile device profiling system 112 comprises a presentation configuration customization module 114 and a presentation configuration matching module 116. The user-driven mobile device profiling system 112 interfaces with a database, such as, for example, presentation configuration preferences database 118. The presentation configuration customization module 114 generally comprises the logic and/or functionality for enabling users to specify, via the mobile website 102, a preferred presentation configuration 122. The preferred presentation configuration 122 may comprise presentation configuration option(s) 124 and corresponding values 126 specified by the users via the mobile website 102. As illustrated in FIG. 1, the preferred presentation configurations 122 are logically mapped to mobile device information 120 related to the corresponding user's mobile communication device. The presentation configuration matching module 116 generally comprises the logic and/or functionality for presenting the mobile website 102 to a new user based on one or more existing configuration option(s) 124 specified by an existing user and stored in the database 118.

One of ordinary skill in the art will appreciate that the user-driven mobile device profiling system 112 may be implemented in software, hardware, firmware, or a combination thereof. In one embodiment, the system is implemented in software or firmware that is stored in a memory and that is executed by a suitable instruction execution system. In software or firmware embodiments, the logic may be written in any suitable computer language. In hardware embodiments, the systems may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
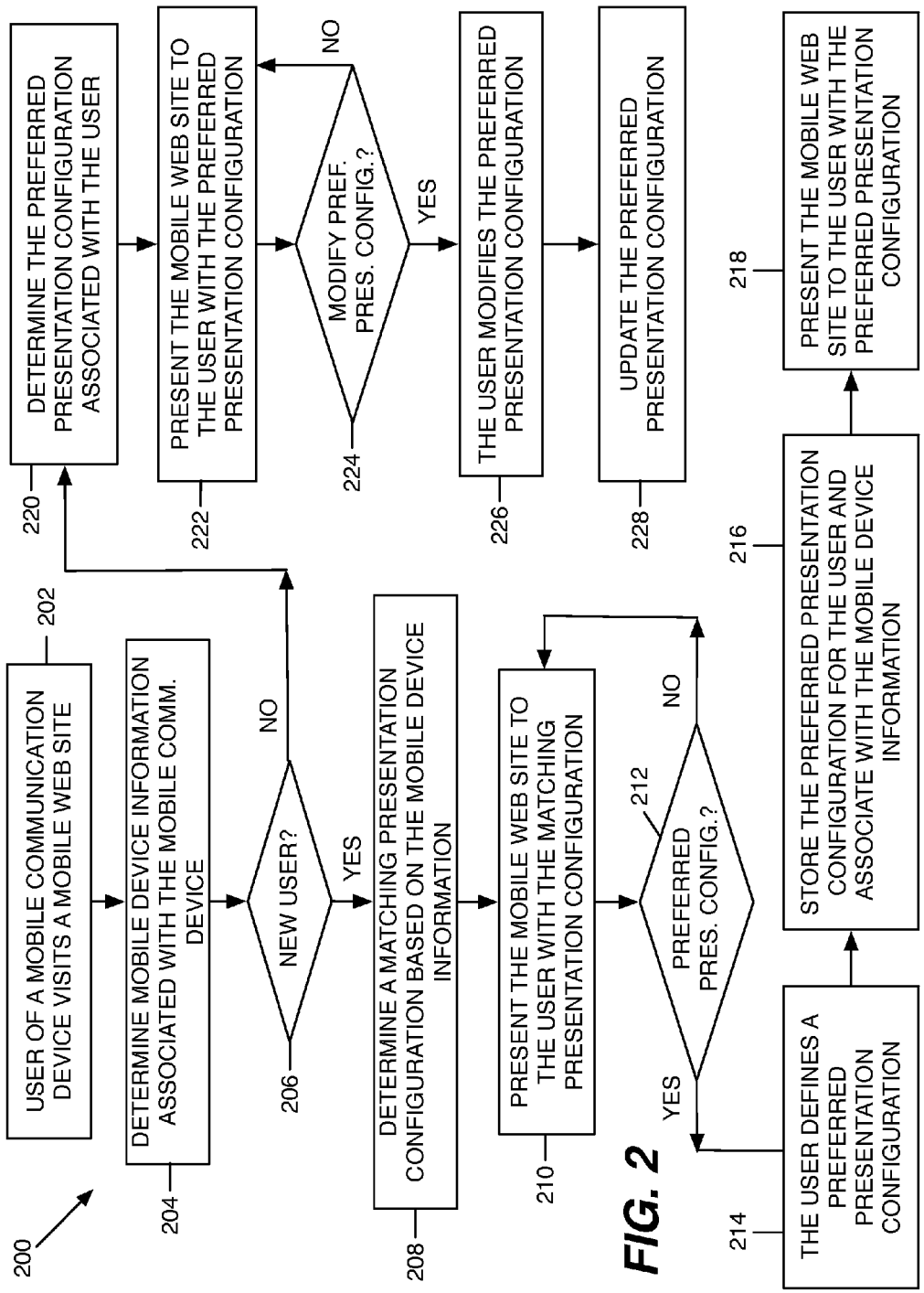
FIG. 2 is a flow chart illustrating an embodiment of a method for providing a mobile website based on user-driven mobile device profiling.

FIG. 2 illustrates one of a number of possible embodiments of a method for profiling and presenting the mobile website 102. At block 202, a user of a mobile communication device 104 accesses the mobile website 102 via the carrier network 106, the Internet 107, or other communications network. At block 204, the server 108 determines mobile device information associated with the mobile communication device 104. As mentioned above, the mobile device information may comprise, for example, information about the mobile communication device 102, information about software located on the mobile communication device 102, information about the communications network used to access the server 108, or other desirable information. The mobile device information may be obtained in various ways. In an embodiment, the server 108 may receive a request from the mobile communication device 102. For example, the request may include a header (e.g., a User-Agent header (in HTTP), a X-WAP profile, etc.) comprising device information about the mobile communication device 102. The server 108 may obtain the mobile device information from this header. In another example, the server 108 may capture information about the carrier network 106 or other network access provider from the IP address from which the request originates. For example, some carriers typically use a block of IP addresses. The server 108 may store information about the IP addresses used by carriers or Internet Service Providers (ISPs) and make decisions about this information to determine the mobile device information 120.

At decision block 206, the server 108 determines whether the user is a new user or an existing user. In an embodiment, the server 108 may make this determination using, for example, cookies, URL strings, a database on the device, etc. or other methods. If the user is a new user, at block 208, the server 108 determines a matching preferred presentation configuration 122 based on the mobile device information determined at block 204. The server 108 may access the presentation configuration preferences database 118 and identify a preferred presentation configuration 122 or process the data to identify one or more presentation configuration options 124. In an embodiment, the mobile device information may be determined based on one or more unique http headers that may be used to determine the carrier, the manufacturer, and/or the model of the mobile communication device 104. This may be implemented via, for example, a detection library located on or in communication with the server 108. Once the mobile communication device 104 is identified, the server 108 may determine a matching preferred presentation configuration 122 in various ways. In an embodiment, the server 108 may query the database 118 for the most common set of configuration data for the current device. For example, if the mobile website 102 has ten configuration features on the site, the server 108 may look-up all users that have saved configuration features for the current device. For each setting, the server 108 may determine what values have been selected most often. For instance, one configuration value may involve image width, and image width may have the possible values of 200, 250, 300, or 400. If a relevant percentage of the time the value 300 is specified, the server 108 may automatically select 300 for all users that have not selected an image width.

At block 210, the server 108 presents the mobile website 102 to the mobile communication device 104 according to the appropriate configuration options 124. In an embodiment, the server 108 may customize the mobile website 102, in real-time, based on the presentation configuration options 124. In other embodiments, the server 108 may configure default profiles as the preferred presentation configurations 122 (or the configuration options 124) are specified by the existing users, and then access the default profiles to present the mobile website 102 to the new user.

The server 108 may also enable new users to create a preferred presentation configuration 122 (decision block 212). For example, in an embodiment, the mobile website 102 may include a "preferences" link, button, or other user interface mechanism for enabling a user to customize or personalize the presentation of the mobile website 102. When selected, the new user may define one or more presentation configuration options 124 (block 214). At block 216, the server 108 stores the presentation configuration options 124 in the presentation configuration preferences database 118 and/or creates a preferred presentation configuration 122 for the new user. As described above and illustrated in FIG. 1, the server 108 may logically map the presentation configuration options 124 to the mobile device information 120 (from block 204). At block 218, the server 108 may present the mobile website 102 to the new user according to the presentation configuration options 124.

Referring again to decision block 206, if the user is an existing user, the server 108 may determine the preferred presentation configuration 122 from the presentation configuration preferences database 118. At block 222, the server 108 presents the mobile website 102 to the existing user according to the user's stored profile. The server 108 may also enable existing users to modify their profiles (decision block 224). At block 226, the existing user modifies one or more presentation configuration options 124. At block 228, the server 108 updates the existing user's preferred presentation configuration 122.

Figure 3:
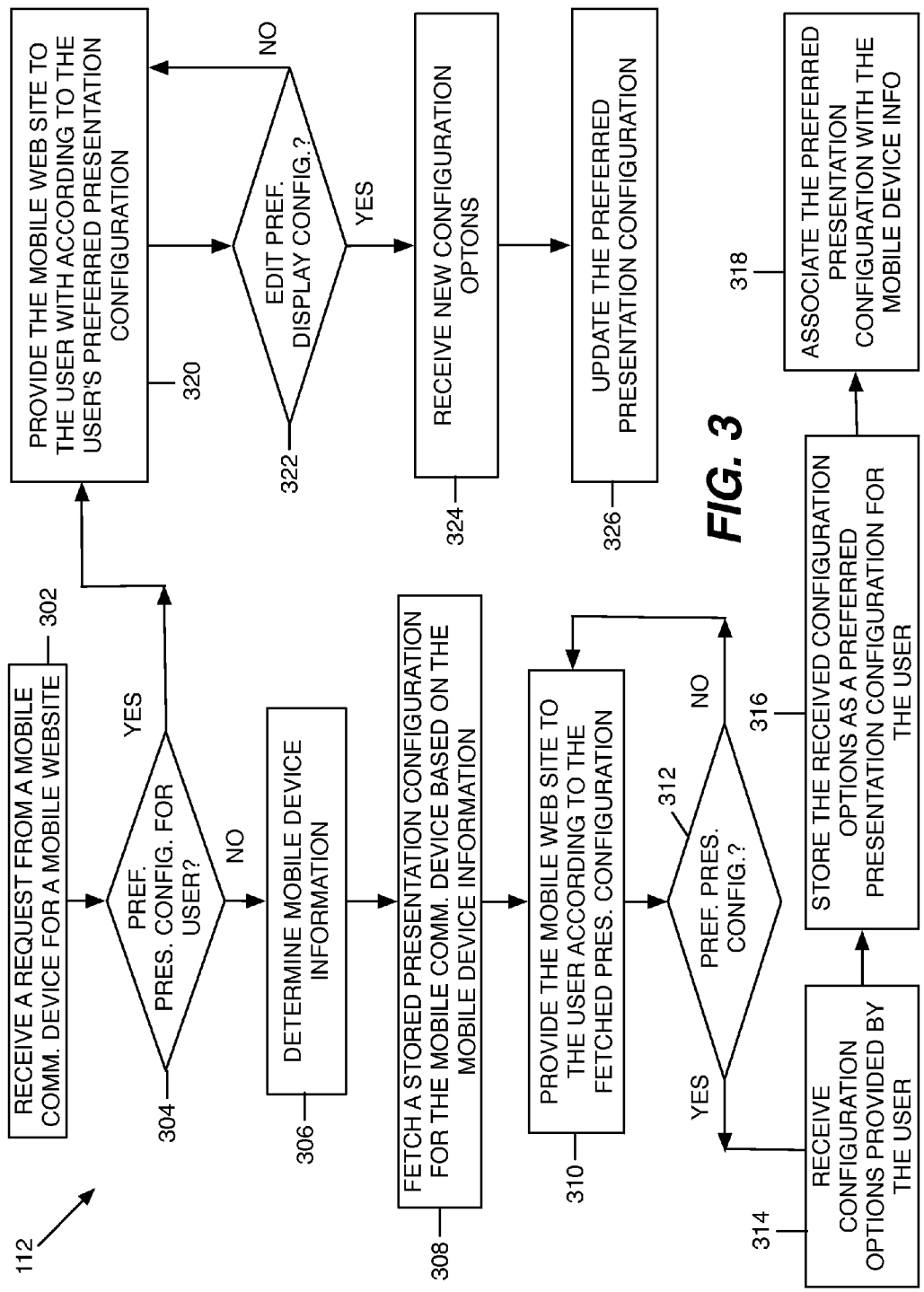
FIG. 3 is a flow chart illustrating the architecture, operation, and/or functionality of an exemplary embodiment of the user-driving mobile device profiling system of FIG. 1.

Having described the general components and operation of the computer system 100, the architecture, operation, and/or functionality of an embodiment of the user-driven mobile device profiling system 112 (FIG. 1) will be described with reference to the flow chart illustrated in FIG. 3. One of ordinary skill in the art will appreciate that the process descriptions or blocks associated with the flowchart of FIG. 3 (as well as FIG. 2) may represent modules, segments, logic or portions of code which include one or more executable instructions for implementing logical functions or steps in the process. It should be further appreciated that any logical functions may be executed out of order from that shown or discussed, including substantially concurrently or in reverse order, depending on the functionality involved, as would be understood by those reasonably skilled in the art. Furthermore, the user-driven mobile device profiling system 112 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or transport the program for use by or in connection with the instruction execution system, apparatus, or device.

At block 302, the user-driven mobile device profiling system 112 receives a request from a mobile communication device 104. At decision block 304, the user-driven mobile device profiling system 112 determines whether there is a preferred presentation configuration 122 associated with the user. If there is not a preferred presentation configuration 122, at block 306, the user-driven mobile device profiling system 112 determines mobile device information 120 associated with the mobile communication device 104, in the manner described above. At block 308, the user-driven mobile device profiling system 112 fetches a presentation configuration from the presentation configuration preferences database 118. The presentation configuration may comprise a preferred presentation configuration 122 associated with an existing user, or may comprise a default profile or default presentation configuration options 124. The user-driven mobile device profiling system 112 fetches a presentation configuration that matches the mobile device information (from block 306). At block 310, the user-driven mobile device profiling system 112 provides the mobile website 102 according to the fetched presentation configuration. At decision block 312, the user-driven mobile device profiling system 112 may enable the new user to create a preferred presentation configuration 122. At block 314, the user-driven mobile device profiling system 112 receives the presentation configuration options 124. At block 316 and 318, the user-driven mobile device profiling system 112 updates the presentation configuration preferences database 118 to incorporate the information provided by the new user.

Referring to decision block 304, if the user has a preferred presentation configuration 122, the user-driven mobile device profiling system 112 provides the mobile website 102 to the mobile communication device 104 according to the user's preferred presentation configuration 122. As illustrated at blocks 322, 324 and 326, the user-driven mobile device profiling system 112 may also enable existing users to edit the preferred presentation configuration 122 and update the presentation configuration preferences database 118 with the new information.

Figure 4:
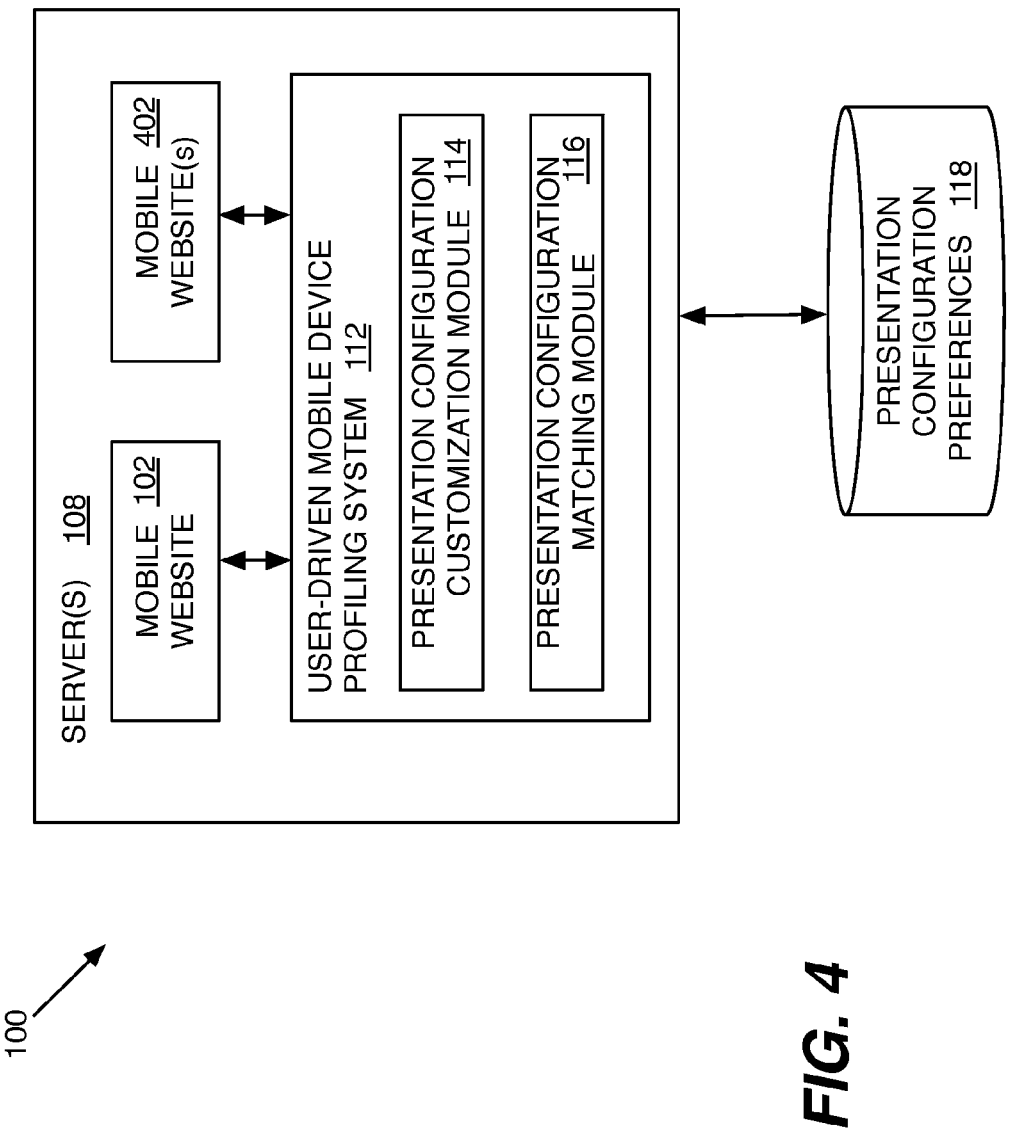
FIG. 4 is a block diagram illustrating another embodiment of a computer system for implementing a user-driven mobile device profiling system across multiple mobile websites.

FIG. 4 illustrates another embodiment of the computer system 100, in which multiple mobile websites (mobile websites 102 and 402) are presented using the user-driven mobile device profiling system 112. The mobile website 102 is profiled in the manner described above. Preferred presentation configurations 122 are specified by users of the mobile website 102. The mobile website 102 is presented to new users based on mobile device information and according to the preferred presentation configurations 122 specified by the existing users. In the embodiment of FIG. 4, the mobile website 402 is also presented to new users according to the preferred presentation configurations 122 specified by existing users of the mobile website 102. In this manner, the user-driven profiling method may be extended across and between multiple mobile websites, further extending the benefits of the user-driven profiles.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A computer system for profiling presentation configurations for a mobile website, the computer system comprising:
    a database comprising a plurality of preferred presentation configurations for presenting a mobile website, each preferred presentation configuration corresponding to a unique user and comprising configuration options specified by the unique user, via the mobile website, for defining a preferred manner in which the mobile website is to be presented to the unique user, each preferred presentation configuration linked to mobile device information associated with a corresponding mobile device used by the unique user to access the mobile site; and
    a web server in communication with the database and configured to provide the mobile website, the web server comprising one or more processors for executing a presentation configuration matching module comprising:
        logic configured to generate a plurality of default presentation configurations for presenting the mobile website to new users based on the configuration options and the mobile device information stored in the plurality of preferred presentation configurations;
        logic configured to receive a request for the mobile website from one of the new users, the request comprising a header identifying new mobile device information related to a new mobile device; and
        logic configured to select one of the plurality of default presentation configurations based on the new mobile device information and present the mobile website to the new mobile device according to the selected default presentation configuration.

2. The computer system of claim 1, wherein the mobile device information comprises at least one of a device type, a device model, a mobile carrier, a network access provider, and a mobile browser associated with the corresponding mobile device.

3. The computer system of claim 1, wherein the header comprises a User-Agent header or a X-WAP profile.

4. The computer system of claim 1, wherein the presentation configuration matching module further comprises logic configured to enable the new user to modify the selected default presentation configuration.

5. The computer system of claim 4, wherein the logic configured to enable the new user to modify the selected default presentation configuration comprises logic configured to define and store in the database a new preferred presentation configuration corresponding to the new user and comprising new configuration options specified by the new user and linked to the new mobile device information.

6. The computer system of claim 5, further comprising logic configured to modify at least one of the default presentation configurations based on the new preferred presentation configuration specified by the new user.

7. The computer system of claim 1, wherein the preferred presentation configurations define one or more of the following: size of images to be displayed; number of images to be displayed; font size; and amount of text to be displayed.

8. The computer system of claim 1, wherein the preferred presentation configurations define one or more characteristics of, or the manner in which, content or functionality are to be presented.

9. A computer program embodied in a non-transitory computer-readable medium and executable by one or more servers, the computer program comprising logic configured to:
store in a database a plurality of preferred presentation configurations for presenting a mobile website, each preferred presentation configuration corresponding to a unique user and comprising configuration options specified by the unique user, via the mobile website, for defining a preferred manner in which the mobile website is to be presented to the unique user, each preferred presentation configuration linked to mobile device information associated with a corresponding mobile device used by the unique user to access the mobile site;
generate a plurality of default presentation configurations by processing the configuration options and the linked mobile device information stored in the database;
receive a request for the mobile website from one of the new users, the request comprising a header identifying new mobile device information related to a new mobile device;
select one of the plurality of default presentation configurations based on the new mobile device information; and
present the mobile website to the new mobile device according to the selected default presentation configuration.

10. The computer program of claim 9, wherein the mobile device information comprises at least one of a device type, a device model, a mobile carrier, a network access provider, and a mobile browser associated with the corresponding mobile device.

11. The computer program of claim 9, wherein the header comprises a User-Agent header or a X-WAP profile.

12. The computer program of claim 9, further comprising logic configured to enable the new user to modify the selected default presentation configuration.

13. The computer program of claim 12, wherein the logic configured to enable the new user to modify the selected default presentation configuration comprises logic configured to define and store in the database a new preferred presentation configuration corresponding to the new user and comprising new configuration options specified by the new user and linked to the new mobile device information.

14. The computer program of claim 13, further comprising logic configured to modify at least one of the default presentation configurations based on the new preferred presentation configuration specified by the new user.

15. The computer program of claim 9, wherein the preferred presentation configurations define one or more of the following: size of images to be displayed; number of images to be displayed; font size; and amount of text to be displayed.

16. The computer program of claim 9, wherein the preferred presentation configurations define one or more characteristics of, or the manner in which, content or functionality are to be presented.

17. A method for profiling presentation configurations for presenting a mobile website, the method comprising:
storing in a database a plurality of preferred presentation configurations for presenting a mobile website, each preferred presentation configuration corresponding to a unique user and comprising configuration options specified by the unique user, via the mobile website, for defining a preferred manner in which the mobile website is to be presented to the unique user, each preferred presentation configuration linked to mobile device information associated with a corresponding mobile device used by the unique user to access the mobile site;
generating a plurality of default presentation configurations by processing the configuration options and the linked mobile device information stored in the database;
receiving a request for the mobile website from one of the new users, the request comprising a header identifying new mobile device information related to a new mobile device;
selecting one of the plurality of default presentation configurations based on the new mobile device information; and
presenting the mobile website to the new mobile device according to the selected default presentation configuration.

18. The method of claim 17, wherein the mobile device information comprises at least one of a device type, a device model, a mobile carrier, a network access provider, and a mobile browser associated with the corresponding mobile device.

19. The method of claim 17, wherein the header comprises a User-Agent header or a X-WAP profile.

20. The method of claim 17, further comprising enabling the new user to modify the selected default presentation configuration.

21. The method of claim 20, wherein the enabling the new user to modify the selected default presentation configuration comprises defining and storing in the database a new preferred presentation configuration corresponding to the new user and comprising new configuration options specified by the new user and linked to the new mobile device information.

22. The method of claim 21, further comprising modifying at least one of the default presentation configurations based on the new preferred presentation configuration specified by the new user.

* * * * *